United States Patent
Liu et al.

(10) Patent No.: US 10,711,456 B2
(45) Date of Patent: Jul. 14, 2020

(54) FIRE-PROOF THERMAL-INSULATION BOARD OF B02 AUTOCLAVED AERATED LIGHTWEIGHT CONCRETE AND METHOD FOR PREPARING SAME

(71) Applicant: Shaanxi Nitya New Materials Technology Co., Ltd., Xi'an, Shaanxi (CN)

(72) Inventors: Yang Liu, Shaanxi (CN); Junqi Li, Shaanxi (CN); Xiaoyu Xue, Shaanxi (CN); Hongtao Jiao, Shaanxi (CN)

(73) Assignee: Shaanxi Nitya New Materials Technology Co., Ltd., Xi'an (CN)

( * ) Notice: Subject to any disclaimer, the term of this patent is extended or adjusted under 35 U.S.C. 154(b) by 0 days.

(21) Appl. No.: 16/158,194

(22) Filed: Oct. 11, 2018

(65) Prior Publication Data

US 2019/0153724 A1   May 23, 2019

(30) Foreign Application Priority Data

Nov. 20, 2017   (CN) .......................... 2017 1 1156127

(51) Int. Cl.
| | |
|---|---|
| *E04B 1/94* | (2006.01) |
| *E04C 1/41* | (2006.01) |
| *C04B 28/18* | (2006.01) |
| *B28B 1/50* | (2006.01) |
| *E04B 1/90* | (2006.01) |
| *C04B 28/14* | (2006.01) |
| *C04B 28/02* | (2006.01) |
| *C04B 103/48* | (2006.01) |
| *C04B 103/63* | (2006.01) |
| *C04B 111/28* | (2006.01) |
| *C04B 111/40* | (2006.01) |
| *E04C 2/04* | (2006.01) |

(52) U.S. Cl.
CPC .................. *E04B 1/94* (2013.01); *B28B 1/50* (2013.01); *C04B 28/02* (2013.01); *C04B 28/144* (2013.01); *C04B 28/18* (2013.01); *E04B 1/90* (2013.01); *E04B 1/942* (2013.01); *E04C 1/41* (2013.01); *C04B 2103/48* (2013.01); *C04B 2103/63* (2013.01); *C04B 2111/28* (2013.01); *C04B 2111/40* (2013.01); *E04C 2/049* (2013.01)

(58) Field of Classification Search
CPC ....... C04B 28/02; C04B 28/18; C04B 28/144; C04B 2103/48; C04B 2103/63; C04B 2111/28; C04B 2111/40; E04B 1/90; E04B 1/94; E04B 1/942; E04C 1/41; E04C 2/049; B28B 1/50
See application file for complete search history.

(56) References Cited

FOREIGN PATENT DOCUMENTS

| CN | 102584121 A | * | 7/2012 |
|---|---|---|---|
| CN | 103601457 A | * | 2/2014 |
| CN | 103922788 A | * | 7/2014 |
| CN | 104557115 A | * | 4/2015 |
| CN | 108439880 A | * | 8/2018 |

* cited by examiner

*Primary Examiner* — Anthony J Green
(74) *Attorney, Agent, or Firm* — Wayne & Ken, LLC; Tony Hom

(57) ABSTRACT

Disclosed is a fire-proof thermal-insulation board of aerated concrete of B02-level lightweight autoclaved sand and its preparation method. Components of the thermal-insulation board are quartz sand, lime, cement, gypsum, aluminum powder, and foam stabilizer, weight percentages of the components are: 56%~60% of the quartz sand, 8%~11% of the lime, 20%~30% of the cement, 2%~4% of the gypsum, 0.24%~0.26% of the aluminum powder, and 0.02%~0.03% of the foam stabilizer. The fire-proof thermal-insulation board is made of an inorganic non-metallic material with lightweight, non-inflammable property and good thermal-insulation performance. The present disclosure well solves the thermal bridge problem of external wall of the building, and has A1-level fire-proof performance and good durability with the same service life as the building. The present disclosure overcomes low product strength, and inconvenience in transportation and construction in the prior art, reduces types of admixture used in the manufacturing process, and reduces the manufacturing cost.

6 Claims, No Drawings

FIRE-PROOF THERMAL-INSULATION BOARD OF B02 AUTOCLAVED AERATED LIGHTWEIGHT CONCRETE AND METHOD FOR PREPARING SAME

CROSS-REFERENCE TO RELATED APPLICATIONS

This application claims to Chinese Application No. 201711156127.2 with a filing date of Nov. 20, 2017. The content of the aforementioned applications, including any intervening amendments thereto, are incorporated herein by reference.

TECHNICAL FILED

The present disclosure relates to a novel and environmentally friendly building material, and more particularly to a fire-proof thermal-insulation board of B02 autoclaved aerated lightweight concrete and a method for preparing the same.

BACKGROUND

At present, thermal-insulation materials in the construction market in China mainly include conventional polymer inflammable thermal-insulation materials such as EPS boards, XPS boards and so on, while there are many potential risks in using such thermal-insulation materials, for example, a low fire-proof level, a short service life, poor capability of resisting wind pressure, cracks on wall surfaces, hollowing, peeling-off, and other defects. In recent years, too many extraordinarily serious fire accidents took place due to the low fire-proof level of the thermal-insulation materials. Therefore, the thermal-insulation materials fail to meet the requirements of modern people's pursuit for safety, greenness, environmental friendliness, non-toxicity, and low VOC.

A fire-proof thermal-insulation board of B02 autoclaved aerated lightweight concrete is featured by having an A1 fire-proof level, a relatively low volume weight and a relatively low coefficient of thermal conductivity. As a new green material for walls, advantages of products thereof are quite remarkable with the development of green buildings.

However, there are following difficulties in manufacturing products of the fire-proof thermal-insulation board of the B02 autoclaved aerated lightweight concrete:
firstly, the fire-proof thermal-insulation board of the B02 autoclaved aerated lightweight concrete: has quite high requirements to raw materials, and a complex mix proportion of the product;
secondly, the manufacturing stability of the fire-proof thermal-insulation board of the B02 autoclaved aerated lightweight concrete: is relatively poor, and requirements to control over various process steps in the manufacturing process are relatively high;
thirdly, the fire-proof thermal-insulation board of the B02 autoclaved aerated lightweight concrete: belongs to brittle inorganic nonmetallic materials with relatively low strength, and has relatively high requirements to manufacturing, transportation, construction, and so on.

SUMMARY

In order to solve the above problems, a fire-proof thermal-insulation board of B02 autoclaved aerated lightweight concrete and a method for preparing the same are provided, which effectively compensate for shortcomings and defects of the prior art mentioned in the preceding, overcome the difficulties in manufacturing, transportation, construction, and so on, render a process proportion for relatively improving the compressive strength with stable manufacturing, and ensure a light weight, thermal insulation, heat protection, sound proofing, and fire proofing of the fire-proof thermal-insulation board of B02 autoclaved aerated lightweight concrete, which has a dry density lower than the lowest level in the national standard GB11968~2006, but can be manufactured in a stable manner and achieve a compressive strength of more than 0.75 MPa.

The above objects of the present disclosure are achieved through the following technical solutions:

The present disclosure provides a fire-proof thermal-insulation board of B02 autoclaved aerated lightweight concrete, with components of quartz sand, cement, lime, gypsum, aluminum powder, and foam stabilizer, where weight percentages of the components are: 56%~60% of the quartz sand, 8%~11% of the lime, 20%~30% of the cement, 2%~4% of the gypsum, 0.24%~0.26% of the aluminum powder, and 0.02%~0.03% of the foam stabilizer.

Preferably, the weight percentages of the components of the fire-proof thermal-insulation board are: 58% of the quartz sand, 11% of the lime, 27.73% of the cement, 3% of the gypsum, 0.25% of the aluminum powder, and 0.02% of the foam stabilizer.

Preferably, a model of the foam stabilizer is GT-717.

Preferably, a content of silicon dioxide in the quartz sand is more than 90%.

Preferably, a content of calcium oxide in the lime is more than 80%.

Preferably, the gypsum is desulphurization gypsum, and a content of sulfur trioxide in the desulphurization gypsum is more than 45%.

Preferably, the aluminum powder is B03 aluminum powder.

A method for preparing the fire-proof thermal-insulation board of B02 autoclaved aerated lightweight concrete as mentioned in any one of the above includes the following steps:

(1) proportionally dosing the components according to the weight percentages: 56%~60% of the quartz sand, 8%~11% of the lime, 20%~30% of the cement, 2%~4% of the gypsum, 0.24%~0.26% of the aluminum powder, and 0.02%~0.03% of the foam stabilizer;

(2) collecting a waste material after manufacturing and cutting a sand aerated concrete green body, and calculating a weight of the waste material according to weights of the components in Step 1, where the waste material accounts for 10% of a total weight;

(3) adding water to the quartz sand to prepare a quartz sand slurry, with a specific gravity of the quartz sand being 1.57~1.60 kg/L; adding water to the gypsum to prepare a gypsum slurry, with a specific gravity of the gypsum being 1.55~1.57 kg/L, and adding water to the waste material obtained after manufacturing and cutting the sand aerated concrete green body to prepare a waste slurry, with a specific gravity of the waste material being (1.39~1.42) kg/L;

(4) metering and dosing the quartz sand slurry, the waste slurry, the gypsum slurry, the lime, and the cement, putting them sequentially into a stirrer to be mixed and stirred, at a stirring rate of 460~480 r/min and a stirring temperature of 36~37° C. for 3 min~4 min, to obtain a first mixture;

(5) adding the aluminum powder and the foam stabilizer to an aluminum powder stirring tank to be mixed and stirred at a stirring rate of 580~600 r/min and a stirring temperature of 10~20° C. for 3 min~5 min, to obtain a second mixture;

(6) putting the second mixture obtained in Step 5 into the first mixture obtained in Step 4, mixing and stirring them in the stirrer at a stirring rate of 460~480 r/min and a stirring temperature of 37~38° C. for 20 s~40 s, to obtain a third mixture;

(7) pouring the third mixture obtained in Step 6 into a mould vehicle for static placing and curing at a static placing temperature of 4548° C. and static placing humidity of 25~27% RH for 4.5~5 h, to obtain a green body;

(8) demoulding and cutting the green body after ending the static placing in Step 7, where in the cutting, hardness of the green body is 160~180, a transverse cutting speed is 2 m/min, a steel wire used in transverse cutting has a diameter of 1.0 mm, a steel wire used in longitudinal cutting has a diameter of 0.8 mm, and a panel is obtained after cutting the green body;

(9) carrying out autoclave curing for the panel after cut: firstly pre-curing the panel for 1 h; vacuumizing to −0.05 MPa~−0.06 MPa in a kettle; then raising a pressure to 1.2 MPa; then keeping the pressure at 1.2 MPa for 7.5 h; then reducing the pressure to 0 MP, to obtain the fire-proof thermal-insulation board of the aerated concrete of the B02-level lightweight autoclaved sand.

Compared with the prior art, the present disclosure has the following beneficial effects:

(1) the fire-proof thermal-insulation board of the aerated concrete of the B02-level lightweight autoclaved sand of the present disclosure, as an inorganic non-metallic material, has the A1 fire-proof level, and may have the product durability with the same service life as the building, thus solving problems of thermal insulation, fire proofing, and durability of external walls;

(2) the external wall of the fire-proof thermal-insulation board of the present disclosure has a self-thermal-insulation system, a low coefficient of thermal conductivity, and good thermal-insulation performance, and the fire-proof thermal-insulation board of the B02 autoclaved aerated lightweight concrete is adhered with a special-purpose adhesive mortar, and it is less likely to generate phenomena such as cracking, peeling-off of a thermal-insulation layer, and so on;

(3) the use of the fire-proof thermal-insulation board of the present disclosure can replace a mode of thermal-insulation process for buildings, "wall body+polystyrene board" in the past, and after aerated concrete of B05- or B06-level autoclaved sand is mounted as a wall body, a thermal bridge is adhered by a B02-level fire-proof thermal-insulation board, that is, requirements to energy consumption of the thermal insulation for the external wall can be met directly with one material—the fire-proof thermal-insulation board of sand aerated concrete, without the additional need for other external thermal-insulation measurements, which the thermal-insulation process for the buildings is simple in procedure, and can greatly shorten duration of construction;

(4) in the process of preparing the fire-proof thermal-insulation board of the present disclosure, the waste slurry is added, which can effectively improve the performances of the thermal-insulation board, meanwhile, in the present disclosure, the casting temperature is reduced, the period of static placing is appropriately prolonged, the cutting hardness is reduced, the cutting speed is decreased, the curing system is controlled, and more excellent performance indicators are achieved: dry density≤195 kg/m$^3$, compressive strength >0.75 MPa, and coefficient of thermal conductivity≤0.058 W/(m·K) in a dry state for the fire-proof thermal-insulation board of the present disclosure;

(5) the present disclosure compensates for the defect of relatively low product strength in the prior art, overcomes shortcomings of low strength of the B02 autoclaved aerated lightweight concrete, and inconvenience in transportation and construction, and meanwhile reduces the use of admixture in the manufacturing process, and reduces the manufacturing cost.

DETAILED DESCRIPTION

In order to make objects, technical solutions, and advantages of the present disclosure more clear, embodiments of the present disclosure will be further illustrated in detail below.

The present disclosure provides a fire-proof thermal-insulation board of B02 autoclaved aerated lightweight concrete, with components of quartz sand, lime, cement, gypsum, aluminum powder, and foam stabilizer, where weight percentages of the components are: 56%~60% of the quartz sand, 8%~11% of the lime, 20%~30% of the cement, 2%~4% of the gypsum, 0.24%~0.26% of the aluminum powder, and 0.02%~0.03% of the foam stabilizer.

Preferably, a model of the foam stabilizer is GT-717.

Preferably, a content of silicon dioxide in the quartz sand is more than 90%.

Preferably, a content of calcium oxide in the lime is more than 80%.

Preferably, the gypsum is desulphurization gypsum, and a content of sulfur trioxide in the desulphurization gypsum is more than 45%.

Preferably, the aluminum powder is B03 aluminum powder.

A method for preparing the fire-proof thermal-insulation board of the B02 autoclaved aerated lightweight concrete: as mentioned in any one of the above includes the following steps:

(1) proportionally dosing various components according to the weight percentages: 56%~60% of the quartz sand, 8%~11% of the lime, 20%~30% of the cement, 2%~4% of the gypsum, 0.24%~0.26% of the aluminum powder, and 0.02%~0.03% of the foam stabilizer;

(2) collecting a waste material after manufacturing and cutting a sand aerated concrete green body, and calculating a weight of the waste material according to weights of the various components in Step 1, where the waste material accounts for 10% of a total weight;

(3) adding water to the quartz sand to prepare a quartz sand slurry, with a specific gravity of the quartz sand being 1.57~1.60 kg/L; adding water to the gypsum to prepare a gypsum slurry, with a specific gravity of the gypsum being 1.55~1.57 kg/L, and adding water to the waste material obtained after manufacturing and cutting the sand aerated concrete green body to prepare a waste slurry, with a specific gravity of the waste material being 1.39~1.42 kg/L;

(4) metering and dosing the quartz sand slurry, the waste slurry, the gypsum slurry, the cement, and the lime, putting them sequentially into a stirrer to be mixed and stirred, at a stirring rate of 460~480 r/min and a stirring temperature of 36~37° C. for 3 min~4 min, to obtain a first mixture;

(5) adding the aluminum powder and the foam stabilizer to an aluminum powder stirring tank to be mixed and stirred at a stirring rate of 580~600 r/min and a stirring temperature of 10~20° C. for 3 min~5 min, to obtain a second mixture;

(6) putting the second mixture obtained in Step 5 into the first mixture obtained in Step 4, mixing and stirring them in the stirrer at a stirring rate of 460~480 r/min and a stirring temperature of 37~38° C. for 20 s~40 s, to obtain a third mixture;

(7) pouring the third mixture obtained in Step 6 into a mould vehicle for static placing and curing at a static placing temperature of 45~48° C. and static placing humidity of 25~27% RH for 4.5~5 h, to obtain a green body;

(8) demoulding and cutting the green body after the static placing in Step 7 is ended, where in the cutting, hardness of the green body is 160~180, a transverse cutting speed is 2 m/min, a steel wire used in transverse cutting has a diameter of 1.0 mm, a steel wire used in longitudinal cutting has a diameter of 0.8 mm, and a panel is obtained after cutting the green body;

(9) carrying out autoclave curing for the panel after cut: firstly pre-curing the panel for 1 h; vacuumizing to −0.05 MPa~−0.06 MPa in a kettle; then raising a pressure to 1.2 MPa; then keeping the pressure at 1.2 MPa for 7.5 h; then reducing the pressure to 0 MP, to obtain the fire-proof thermal-insulation board of the aerated concrete of the B02-level lightweight autoclaved sand.

Embodiment 1

The components were dosed: 56% of quartz sand, 10% of lime, 30% of cement, 3.7% of gypsum, 0.24% of B03 aluminum powder, and 0.03% of GT-717 type foam stabilizer, where a waste material was 10% of a total weight of the components.

Water was added to the quartz sand to prepare a quartz sand slurry, with a specific gravity being 1.58 kg/L; water was added to the gypsum to prepare a gypsum slurry, with a specific gravity being 1.55 kg/L, and water was added to the waste material obtained after manufacturing and cutting to prepare a waste slurry, with a specific gravity being 1.40 kg/L; the quartz sand slurry, the waste slurry, the gypsum slurry, the cement, and the lime were metered and dosed, and were put sequentially into a stirrer to be mixed and stirred at a stirring rate of 460 r/min and a stirring temperature of 36° C. for 4 min; the aluminum powder and the foam stabilizer were added to an aluminum powder stirring tank to be mixed and stirred at a stirring rate of 580 r/min and a stirring temperature of 10° C. for 3 min; the aluminum powder mixed solution was put into a mixture of the quartz sand and so on to be stirred in the stirrer at a stirring rate of 460 r/min and a stirring temperature of 37° C. for 20 s. A mixture finally obtained was poured into a mould vehicle for static placing and curing at a static placing temperature of 45° C. and static placing humidity of 25% RH for 4.5 h; after the static placing was ended, demoulding and cutting were carried out, where in the cutting, the hardness of the green body was 160, a transverse cutting speed was 2 m/min, a steel wire used in transverse cutting had a diameter of 1.0 mm, a steel wire used in longitudinal cutting had a diameter of 0.8 mm; autoclave curing was carried out for the cut panel: firstly pre-curing the panel for 1 h; vacuumizing to −0.05 MPa in a kettle; raising a pressure to 1.2 MPa; keeping the pressure at 1.2 MPa for 7.5 h; then reducing the pressure to 0 MPa, to obtain the fire-proof thermal-insulation board of the B02 autoclaved aerated lightweight concrete of the present disclosure.

A product of the present example had the following performances: dry density of 195 kg/m$^3$, compressive strength of 0.77 MPa, and coefficient of thermal conductivity of less than 0.058 W/(m K) in a dry state.

Embodiment 2

The components were dosed: 60% of quartz sand, 11% of lime, 26.71% of cement, 2% of gypsum, 0.26% of B03 aluminum powder, and 0.03% of GT-717 type foam stabilizer, where a waste material was 10% of a total weight of the components.

Water was added to the quartz sand to prepare a quartz sand slurry, with a specific gravity being 1.58 kg/L; water was added to the gypsum to prepare a gypsum slurry, with a specific gravity being 1.55 kg/L, and water was added to the waste material obtained after manufacturing and cutting to prepare a waste slurry, with a specific gravity being 1.40 kg/L; the quartz sand slurry, the waste slurry, the gypsum slurry, the cement, and the lime were metered and dosed, and put sequentially into a stirrer to be mixed and stirred at a stirring rate of 480 r/min and a stirring temperature of 37° C. for 4 min; the aluminum powder and the foam stabilizer were added to an aluminum powder stirring tank to be mixed and stirred at a stirring rate of 600 r/min and a stirring temperature of 20° C. for 4 min; the aluminum powder mixed solution was put into a mixture of the quartz sand and so on to be stirred in the stirrer at a stirring rate of 480 r/min and a stirring temperature of 38° C. for 40 s. A mixture finally obtained was poured into a mould vehicle for static placing and curing at a static placing temperature of 48° C. and static placing humidity of 27% RH for 5 h; after the static placing was ended, demoulding and cutting were carried out, where in the cutting, the hardness of the green body was 180, a transverse cutting speed was 2 m/min, a steel wire used in transverse cutting had a diameter of 1.0 mm, a steel wire used in longitudinal cutting had a diameter of 0.8 mm; autoclave curing was carried out for the cut panel: firstly pre-curing the panel for 1 h; vacuumizing to −0.06 MPa in a kettle; raising a pressure to 1.2 MPa; keeping the pressure at 1.2 MPa for 7.5 h; then reducing the pressure to 0 MPa, to obtain the fire-proof thermal-insulation board of the B02 autoclaved aerated lightweight concrete of the present disclosure.

A product of the present example had the following performances: dry density of 195 kg/m$^3$, compressive strength of 0.76 MPa, and coefficient of thermal conductivity of less than 0.058 W/(m K) in a dry state.

Embodiment 3

The components were dosed: 58% of quartz sand, 11% of lime, 27.73% of cement, 3% of gypsum, 0.25% of B03 aluminum powder, and 0.02% of GT-717 type foam stabilizer, where a waste material was 10% of a total weight of the components.

Water was added to the quartz sand water was added to prepare a quartz sand slurry, with a specific gravity being 1.58 kg/L; water was added to the gypsum to prepare a gypsum slurry, with a specific gravity being 1.55 kg/L, and water was added to the waste material obtained after manufacturing and cutting to prepare a waste slurry, with a specific gravity being 1.40 kg/L; the quartz sand slurry, the waste slurry, the gypsum slurry, the cement, and the lime were metered and dosed, and put sequentially into a stirrer to be mixed and stirred at a stirring rate of 470 r/min and a stirring temperature of 37° C. for 4 min; the aluminum powder and the foam stabilizer were added to an aluminum powder stirring tank to be mixed and stirred at a stirring rate of 590 r/min and a stirring temperature of 15° C. for 4 min; the aluminum powder mixed solution was put into a mixture of the quartz sand and so on to be stirred in the stirrer at a stirring rate of 470 r/min and a stirring temperature of 37° C. for 30 s. A mixture finally obtained was poured into a mould vehicle for static placing and curing at a static placing temperature of 46° C. and static placing humidity of 26%

RH for 4.5 h; after the static placing was ended, demoulding and cutting were carried out, where in the cutting, the hardness of the green body was 170, a transverse cutting speed was 2 m/min, a steel wire used in transverse cutting had a diameter of 1.0 mm, a steel wire used in longitudinal cutting had a diameter of 0.8 mm; autoclave curing was carried out for the cut panel: firstly pre-curing the panel for 1 h; vacuumizing to −0.06 MPa in a kettle; raising a pressure to 1.2 MPa; keeping the pressure at 1.2 MPa for 7.5 h; then reducing the pressure to 0 MPa, to obtain the fire-proof thermal-insulation board of the B02 autoclaved aerated lightweight concrete of the present disclosure.

A product of the present example had the following performances: dry density of 194 kg/m$^3$, compressive strength of 0.78 MPa, and coefficient of thermal conductivity of less than 0.057 W/(m K) in a dry state.

To sum up, the fire-proof thermal-insulation board of the B02 autoclaved aerated lightweight concrete disclosed in the present disclosure has the following parameters of performances: dry density≤195 kg/m$^3$, compressive strength >0.75 MPa, and coefficient of thermal conductivity≤0.058 W/(m·K) in a dry state. The performances are remarkably superior to parameters of performances of the existing fire-proof thermal-insulation boards.

The fire-proof thermal-insulation board of the B02 autoclaved aerated lightweight concrete of the present disclosure, as an inorganic non-metallic material, has the A1 fire-proof level, and may have the product durability with the same service life as the building, thus solving problems of thermal insulation, fire proofing, and later maintenance of external walls; the external wall of the fire-proof thermal-insulation board of the present disclosure has a self-thermal-insulation system, a low coefficient of thermal conductivity, and good thermal-insulation performance, and the fire-proof thermal-insulation board of B02-level sand aerated concrete is adhered with a special-purpose adhesive mortar, and it is less likely to generate phenomena such as cracking, peeling-off of the thermal-insulation layer, and so on; the use of the fire-proof thermal-insulation board of the present disclosure can replace a mode of thermal-insulation process for buildings, "wall body+polystyrene board" in the past, and after aerated concrete of B05- or B06-level autoclaved sand is mounted as a wall body, a thermal bridge is adhered by the B02-level fire-proof thermal-insulation board, that is, requirements to energy consumption of the thermal insulation for the external wall can be met directly with one material—the fire-proof thermal-insulation board of sand aerated concrete, without the additional need for other external thermal-insulation measurements, which thermal-insulation process for buildings is simple in procedure, and can greatly shorten duration of construction; in the process of preparing the fire-proof thermal-insulation board of the present disclosure, the waste slurry is added, which can effectively improve the performances of the thermal-insulation board, meanwhile, in the present disclosure, the casting temperature is reduced, the period of static placing is appropriately prolonged, the cutting hardness is reduced, the cutting speed is decreased, the curing system is controlled, and more excellent performance indicators are achieved; the present disclosure compensates for the defect of relatively low product strength in the prior art, overcomes shortcomings of low strength of the B02 autoclaved aerated lightweight concrete, and inconvenience in transportation and construction, and meanwhile reduces the use of admixture in the manufacturing process, and reduces the manufacturing cost.

Although the embodiments of the present disclosure are disclosed as the above, the present disclosure is not limited to the implementations enumerated in the description and the embodiments, and it absolutely can be adapted to various fields applicable to the present disclosure. A person familiar to the art may readily realize other modifications. Therefore, without departing from general concepts defined in the claims and equivalent scope, the present disclosure is not limited to specific details.

What is claimed is:

1. A fire-proof thermal-insulation board of B02 autoclaved aerated lightweight concrete, characterized in that components of the fire-proof thermal-insulation board of the B02 autoclaved aerated lightweight concrete are quartz sand, lime, cement, gypsum, aluminum powder, and foam stabilizer; wherein weight percentages of the components are: 56%~60% of the quartz sand, 8%~11% of the lime, 20%~30% of the cement, 2%~4% of the gypsum, 0.24%~0.26% of the aluminum powder, and 0.02%~0.03% of the foam stabilizer.

2. The fire-proof thermal-insulation board of the B02 autoclaved aerated lightweight concrete according to claim 1, characterized in that the weight percentages of the components of the fire-proof thermal-insulation board are: 58% of the quartz sand, 11% of the lime, 27.73% of the cement, 3% of the gypsum, 0.25% of the aluminum powder, and 0.02% of the foam stabilizer.

3. The fire-proof thermal-insulation board of the B02 autoclaved aerated lightweight concrete according to claim 2, characterized in that a content of silicon dioxide in the quartz sand is more than 90%.

4. The fire-proof thermal-insulation board of the B02 autoclaved aerated lightweight concrete according to claim 2, characterized in that a content of calcium oxide in the lime is more than 80%.

5. The fire-proof thermal-insulation board of the B02 autoclaved aerated lightweight concrete according to claim 2, characterized in that the gypsum is desulphurization gypsum, and a content of sulfur trioxide in the desulphurization gypsum is more than 45%.

6. A method for preparing the fire-proof thermal-insulation board of the B02 autoclaved aerated lightweight concrete according to claim 1, characterized by comprising the following steps:
   step 1: proportionally dosing the components according to the weight percentages: 56%~60% of the quartz sand, 8%~11% of the lime, 20%~30% of the cement, 2%~4% of the gypsum, 0.24%~0.26% of the aluminum powder, and 0.02%~0.03% of the foam stabilizer;
   step 2: collecting a waste material after manufacturing and cutting a sand aerated concrete green body, and calculating a weight of the waste material according to weights of the components in Step 1; wherein the waste material accounts for 10% of a total weight;
   step 3: adding water to the quartz sand to prepare a quartz sand slurry, with a specific gravity of the quartz sand being 1.57~1.60 kg/L; adding water to the gypsum to prepare a gypsum slurry, with a specific gravity of the gypsum being 1.55~1.57 kg/L; and adding water to the waste material obtained after manufacturing and cutting the sand aerated concrete green body to prepare a waste slurry, with a specific gravity of the waste material being 1.39~1.42 kg/L;
   step 4: metering and dosing the quartz sand slurry, the waste slurry, the gypsum slurry, the cement, and the lime; then putting sequentially into a stirrer to be mixed and stirred at a stirring rate of 460~480 r/min and a stirring temperature of 36~37° C. for 3 min~4 min, to obtain a first 3 mixture;

step 5: adding the aluminum powder and the foam stabilizer to an aluminum powder stirring tank to be mixed and stirred at a stirring rate of 580~600 r/min and a stirring temperature of 10~20° C. for 3 min~5 min, to obtain a second mixture;

step 6: putting the second mixture obtained in Step 5 into the first mixture obtained in Step 4; mixing and stirring in the stirrer at a stirring rate of 460~480 r/min and a stirring temperature of 37~38° C. for 20 s~40 s, to obtain a third mixture;

step 7: pouring the third mixture obtained in Step 6 into a mould vehicle for static placing and curing at a static placing temperature of 45~48° C. and static placing humidity of 25~27% RH for 4.5~5 h, to obtain a green body;

step 8: demoulding and cutting the green body after ending the static placing in Step 7; wherein in the cutting, a transverse cutting speed is 2 m/min, a steel wire used in transverse cutting has a diameter of 1.0 mm, a steel wire used in longitudinal cutting has a diameter of 0.8 mm, and a panel is obtained after cutting the green body;

step 9: carrying out autoclave curing for the panel after cut: firstly pre-curing the panel for 1 h; vacuumizing to −0.05 MPa~−0.06 MPa in a kettle; then raising a pressure to 1.2 MPa; then keeping the pressure at 1.2 MPa for 7.5 h; then reducing the pressure to 0 MPa, to obtain the fire-proof thermal-insulation board of the B02 autoclaved aerated lightweight concrete.

* * * * *